United States Patent Office 2,821,664
Patented Jan. 28, 1958

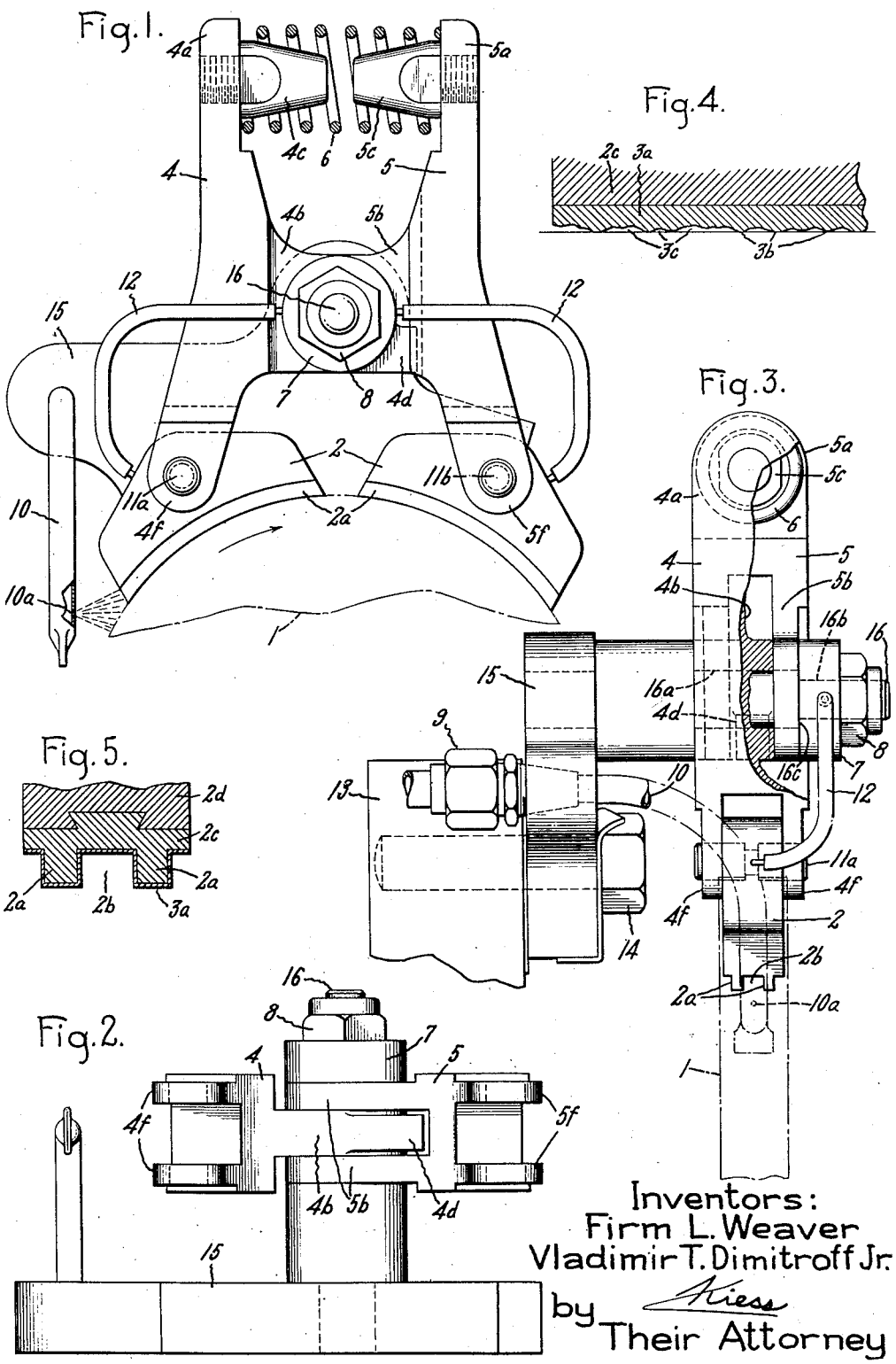

2,821,664

GROUNDING DEVICE TO PREVENT STRAY CURRENTS IN SHAFT BEARINGS

Firm L. Weaver, Lynnfield Center, and Vladimir T. Dimitroff, Jr., Stoneham, Mass., assignors to General Electric Company, a corporation of New York Application October 28, 1955, Serial No. 543,339

6 Claims. (Cl. 317—2)

This invention relates to an electrical grounding device, and more particularly to a device for grounding electrical currents generated in a high speed shaft which if not removed would tend to cause deterioration of the bearings or other close clearance parts in a turbo-machine.

During operation of a high speed turbine, shaft voltages have been generated by the turbine shaft which have reached a magnitude of 200 volts. Condensing turbines normally generate a voltage to ground in the neighborhood of 20 to 40 volts. These shaft voltages, called "shunt voltages," appear from rotor to ground. They should not be confused with the normal "series voltage" which appears between the ends of the turbine generator shaft, and is produced by the unavoidable "magnetic unbalance" of the generator.

The creation of "static voltages" within the turbine is almost as mysterious as the build up of lightning within a thundercloud. However, while mysterious in origin, it has caused thrust bearing failures by arcing across the oil film between the shaft and bearing.

Accordingly, it is an object of this invention to provide a grounding device which will ground the turbine shaft and thus protect the bearings or other close clearance parts in the system from deterioration due to electrical current passing from shaft to ground through the bearings.

A further object is to provide a novel grounding device which is maintained in contact with the rotor shaft regardless of shaft vibration.

Other objects and advantages will become apparent from the following description taken in connection with the accompanying drawings, in which Fig. 1 is a front view of the grounding device, Fig. 2 is a bottom view taken with the brushes removed, Fig. 3 is a side view, and Figs. 4 and 5 are detail views of the grounding brushes.

Generally stated, the invention is practiced by providing a grounding device disposed in contact with the shaft which drains the current generated by the shaft to ground. The grounding device includes a brush maintained in electrical contact with the shaft, irrespective of vibrations set up by the shaft which would tend to disengage the grounding device. The construction of the brush permits it to be adequately lubricated while being in grounding contact with the shaft.

Referring now to Fig. 1, there is illustrated the applicant's novel grounding device which is disposed adjacent to and in grounding contact with the shaft 1. The device includes grounding brushes 2 in electrical contact with the shaft to remove the current generated thereby, and a "scissors type" structural arrangement supporting the brush while leaving the brushes 2 free to seek positive alignment relative to the shaft. The brush supporting structure is in turn connected to a grounded support member 13. The current is positively transmitted from the brushes 2 to the brush supporting structure by ground leads 12.

Each of the brushes 2 consists of arcuate members defining shaft contacting surfaces having substantially the same radius of curvature as the shaft 1. These brushes are disposed at an acute angle relative to each other. As can be seen from Figs. 3 and 5, the shaft contacting surfaces comprises narrow axial lands 2a between which is formed a channel 2b. Lubricant is admitted into the channel 2b for lubricating the brushes. The arrangement for lubricating the brush will be described later in detail.

The brushes 2 are disposed between the flange portions 4f, 5f defined by support members 4, 5 respectively and are secured thereto by pins 11a, 11b extending through aligned openings in the flange portions 4f, 5f and the brushes 2. This construction permits the brushes 2 to rotate about pins 11a, 11b to seek positive alignment relative to the shaft 1.

The support members 4, 5 define intermediate portions 4b, 5b which are interengaged by the tongue and groove relationship disclosed in Fig. 2. The portions 4b, 5b define aligned openings through which a shaft 16, defining reduced diameter portions 16a, 16b (Fig. 3), extends. The members 4, 5 are free to rotate about the reduced shaft portion 16a so that the brushes 2 may be accurately located relative to the shaft 1. A washer 7 is disposed on the shaft portion 16b and adapted to abut against the shoulder 16c defined between the shaft portions 16a, 16b. The washer 7 is biased against the shoulder 16c and maintained in place by a nut 8 which is threaded onto shaft portion 16b. The width of the portion of the member 5 contacting the shaft 16a is less than the width of shaft portion 16a so that when the washer 7 and nut 8 is secured in place, the members 4, 5 are free to rotate.

The members 4, 5 define arms 4a, 5a which have lug portions 4c, 5c respectively. These lug portions are disposed opposite each other when the grounding device has been secured relative to the shaft. This relative location is maintained by a stop portion 4d (Figs. 1 and 2) which abuts member 5 after a predetermined relative rotation between members 4, 5.

Located between arms 4a, 5a is a spring 6 biasing arms 4a, 5a away from each other. The primary function of this spring and lug arrangement is to bias the brushes 2 into contact with the shaft 1. The spring is designed to get proper unit loadings on the brush. In addition, this arrangement insures that one brush will at all times, be in electrical contact with the shaft 1. This is accomplished by the fact that in the event that one brush is removed from contact with the shaft by vibration or other causes, the movement of the brush will act through member 4 and spring 6 to increase the spring force on member 5 so that the brush secured thereto will be urged more firmly into contact with the shaft 1. The grounding device is designed so that it has very little mass, to reduce the tendency for shaft vibration to cause the brush to "bounce" out of contact with the shaft.

The shaft 16 is in turn secured to a bracket 15 which is connected to a grounded frame element 13 by bolts 14. Also connected to bracket 15 is a fitting 9 adapted to receive oil from a suitable source (not shown) and distribute to the brushes 2 by means of a flexible tube 10. The tube 10 has an orifice 10a which, as can be seen from Fig. 1, is disposed adjacent the portion of the shaft 1 contacted by brush 2. It will, of course, be understood that this lubricating oil supply is at a suitable pressure to insure adequate flow of oil to lubricate and partially cool the brushes and shaft.

The rotation of the shaft 1 in a clockwise direction carries with it the oil sprayed thereon through the tube 10 and nozzle 10a, up into the channel 2b and between the brushes 2 and the shaft.

To insure a positive ground connection between the brushes 2 and the grounded element 13, ground leads 12 are disposed between the brushes 2 and the washer member 7. Therefore, the current will be directly transmitted from the brushes to the grounded element without the possibility of arcing across loose-fitting members.

The construction of the brushes can be seen by referring to Figs. 4 and 5. The brush consists of a steel base 2d and a layer of babbitt 2c, upon which a covering of a silver-rich alloy or pure silver 3a is disposed. By a silver-rich alloy is meant a composition consisting of silver in excess of 75% thereof. Silver or silver-rich alloys are used because of their excellent wearing and electrical conducting properties. Additional advantages are that if silver oxides are formed they also have good electrical conducting properties; and at high temperatures silver oxide reduces back to its original state where its very high conductive properties are again present.

As previously mentioned the brushes 2 have very narrow axially spaced lands 2a with a channel shaped recess 2b formed therebetween. The width of these lands, the force exerted by spring 6, and the pressure of the lubricating oil are important factors in determining the oil film thickness existing between the brush and shaft.

Assuming a constant spring force and oil supply pressure, the oil film thickness will vary with the width of the lands 2b. This is due to the fact that as the surface area increases the force exerted by the pressure in the oil film also increases. The increased upward force would tend to enlarge the space between the brush and shaft to increase the oil film thickness. It is therefore necessary to accurately coordinate the width of the lands 2b with the spring force and oil pressure to maintain a minimum oil film thickness.

The oil film thickness should be such that the voltage generated by the shaft will cause a current to flow from the shaft through the brush to ground without arcing. If arcing across the oil film is permitted, the brushes will become pitted, making replacement necessary. It has been found that with an oil film of up to .0002" the "shaft generated" voltage will not arc across to the brush. With a brush pressure against the shaft of 100 p. s. i., oil supply pressure of 12 p. s. i. g., and a land thickness on the order of 3/32" the oil film formed has been found to be on the order of .0001" thick and no arcing has resulted. These dimensions are by way of example only, to illustrate an actual construction which has been found effective.

When an oil film on the order of .0001" is maintained the brush shows essentially no wear. Also, if any film forms on the brush face it does not appreciably vary the voltage drop with time.

This grounding device is not limited to an arrangement in which the grounding brush is separated from positive contact with the shaft by an oil film maintained therebetween. A silver-plated brush having a finish on the order of 50 micro-inches is represented in Fig. 4 in which the peaks 3b are believed to be in positive metal to metal contact with the shaft and a series of valleys 3c contain lubricant for lubricating the brushes. In this instance a silver oxide will form on the brush but as previously mentioned, silver oxide is a good conductor of electricity and the shaft voltage will be grounded through the brush.

With this construction a film of lubricant will exist between the shaft and the valley portions for reducing the wearing of the brushes and serve to help cool the brush and shaft. The motion of the shaft throws oil into the channel 2b and between the peaks and shaft to lubricate that portion of the brush.

It will be obvious to those skilled in the art that numerous other changes and substitutions of mechanical equivalents might be made in the construction and assembly of the various components of the brush assembly. For example, the grounding device could consist of a pair of individually mounted spring pressed brushes located around the circumference of the shaft. It is also within the scope of this invention to use a brush having a contacting surface made of long wearing materials having good electrical conducting properties other than silver or a silver-rich alloy. Other possible modifications include using wick lubrication and constructing the brush of three or more lands.

It is, of course, desired to cover by the appended claims all such modifications as fall within the true spirit and scope of the invention.

What we claim as new and desire to secure by Letters Patent of the United States is:

1. A grounding device for a shaft including a brush, grounded means supporting the brush relative to the shaft, means resiliently biasing the brush into contact with the shaft, and lubricating means providing a film of lubricating oil on the order of .0001" thick between the brush and shaft whereby the brush will be lubricated and any currents generated in the shaft will pass through the oil film and to ground without arcing.

2. A grounding device for a shaft comprising a brush, first means supporting the brush relative to the shaft, a grounded element secured to said first means, resilient means biasing the brush into contact with the shaft, the contacting surface of the brush adjacent the shaft consisting of axially spaced land portions with a groove defined therebetween, and means providing an oil film having a thickness up to .0002" between said lands and shaft whereby the brush will be lubricated and currents generated in the shaft will pass through the oil film and to ground without arcing.

3. A device for electrically grounding a shaft in which stray currents are generated comprising a brush, grounded means pivotally supporting the brush relative to the shaft, resilient means biasing the brush into contact with the shaft, the brush defining axially spaced arcuate lands having a bearing surface adapted to contact the shaft and having substantially the same radius of curvature as the shaft, the bearing surface of the brush being coated with a composition consisting essentially of silver whereby the brush has good wearing and electrical conducting properties, and means supplying lubricating oil to the space between said lands for lubricating the brush.

4. A brush assembly for a shaft comprising two lever members supported at opposite sides of a common pivot, each of said lever members having a first arm disposed adjacent the shaft and a second arm at the opposite side of the support pivot, said second arms being disposed generally parallel and adjacent to each other, a grounding brush pivotally connected to each of said first arms, spring means disposed between and contacting said second arms to bias said lever members apart about their common pivot to effect engagement of the brushes with the shaft, and means for supplying lubricating oil to the rubbing surface of the brushes.

5. A grounding device in accordance with claim 4 in which each brush defines axially spaced arcuate lands having substantially the same radius of curvature as said shaft and defining therebetween an arcuate channel which serves as a lubricant reservoir and supply passage, the bearing surface of each land consisting essentially of a silver composition whereby the brush has good wearing and electrical conducting properties.

6. A grounding device for a machine shaft in which stray currents are generated comprising two circumferentially spaced grounding brushes, a grounded shaft for supporting said brushes, a pair of lever members pivotally mounted on said grounded shaft with each having first and second arm portions disposed on opposite sides of their pivot, the first arm portions being disposed adjacent the first shaft, means pivotally connecting a brush member to the first arm of each lever member, spring means disposed between the second arms of said levers to bias them in opposite directions about their support pivot to urge the brushes into electrical contact with said machine shaft, each brush having axially spaced arcuate lands of substantially the same radius of curvature as the machine shaft, the contacting surface of said lands consisting essentially of a silver composition whereby the brush has good wearing and electrical conducting properties, and means supplying lubricating oil to the arcuate channel between the lands of the brush to lubricate the brushes.

References Cited in the file of this patent

UNITED STATES PATENTS

| | | |
|---|---|---|
| 2,108,530 | Ellis | Feb. 15, 1938 |
| 2,256,118 | Kyropaulos | Sept. 16, 1941 |